(12) United States Patent
Kaylo et al.

(10) Patent No.: US 8,795,836 B2
(45) Date of Patent: Aug. 5, 2014

(54) ELECTRODEPOSITABLE COATING COMPOSITION COMPRISING A BISMUTH SALT AND A STABILIZING COMPOUND

(75) Inventors: Alan J. Kaylo, Glenshaw, PA (US); Kevin J. Dufford, Karns City, PA (US); Steven D. Perrine, Allison Park, PA (US); Michael J. Pawlik, Glenshaw, PA (US); Richard F. Karabin, Ruffs Dale, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 127 days.

(21) Appl. No.: 12/716,305

(22) Filed: Mar. 3, 2010

(65) Prior Publication Data

US 2011/0214992 A1    Sep. 8, 2011

(51) Int. Cl.
| | | |
|---|---|---|
| *B32B 27/00* | (2006.01) | |
| *C25D 9/00* | (2006.01) | |
| *C09D 5/00* | (2006.01) | |
| B32B 27/38 | (2006.01) | |
| C09D 163/00 | (2006.01) | |

(52) U.S. Cl.
USPC ........ 428/411.1; 205/118; 205/205; 205/316; 205/317

(58) Field of Classification Search
USPC ............. 205/80, 98, 118, 183, 205, 316, 317; 428/411.1, 457, 469, 689
See application file for complete search history.

(56) References Cited

U.S. PATENT DOCUMENTS

| | | | |
|---|---|---|---|
| 6,190,524 B1 | 2/2001 | Kollah et al. | |
| 6,607,653 B1 * | 8/2003 | Tsuji et al. | 205/241 |
| 6,624,215 B1 | 9/2003 | Hiraki et al. | |
| 2004/0050704 A1 | 3/2004 | Rakiewicz et al. | |
| 2004/0146716 A1 * | 7/2004 | Lehmann et al. | 428/413 |
| 2006/0113006 A1 * | 6/2006 | Masuda et al. | 148/270 |

FOREIGN PATENT DOCUMENTS

| | | |
|---|---|---|
| EP | 1 041 125 B1 | 1/2007 |
| JP | 2000 230151 A | 8/2000 |

* cited by examiner

*Primary Examiner* — Michael J Feely
(74) *Attorney, Agent, or Firm* — Alicia M. Passerin

(57) ABSTRACT

The present invention is directed to an electrodepositable coating composition comprising a bismuth salt and a stabilizing agent, and wherein the molar ratio of elemental bismuth to the stabilizing agent is not less than 1:0.25.

18 Claims, No Drawings

ELECTRODEPOSITABLE COATING COMPOSITION COMPRISING A BISMUTH SALT AND A STABILIZING COMPOUND

BACKGROUND OF THE INVENTION

1. Field of the Invention

The present invention relates to an electrodepositable coating composition comprising a bismuth salt and a stabilizing compound.

2. Background Information

One advantage of an electrodeposition coating process is that a coating can be deposited onto a substrate even if the substrate has a complicated shape. Accordingly, the electrodeposition coating process has been used in a variety of industries such as the industrial, automotive, and aerospace industries. In general, the electrodeposition coating process is carried out by immersing a substrate into an electrodeposition bath, which contains an electrodepositable (electrodeposition) coating composition, and applying voltage to the substrate thereby coating the substrate with the electrodepositable coating composition. After the electrodepositable coating composition has been applied onto the substrate, the coating composition can be cured using means that are known in the art such as thermal radiation.

The ability of an electrodepositable coating composition to cure at nominal and/or underbake conditions after a certain amount of time (i.e., coating stability or shelf life) is typically taken into account prior to its use. Coating compositions, therefore, having a longer shelf life (e.g., 14 days) are usually preferred over those coating compositions having a short shelf life (e.g., 3 days).

SUMMARY OF THE INVENTION

The present invention is directed to an electrodepositable coating composition comprising a bismuth salt and a stabilizing agent and wherein the molar ratio of elemental bismuth to the stabilizing agent is not less than 1:0.25.

The present invention is also directed to a method for making an electrodepositable composition comprising: (i) a first component, (ii) a second component, and (iii) a third component; the method comprising: dispersing components (i), (ii), and (iii), into an aqueous solution; wherein component (i) comprises a film-forming polymer, a curing agent that is capable of reacting with the film-forming polymer, and, optionally, a stabilizing agent; wherein component (ii) comprises a water-dispersible grind resin, a pigment, and, optionally, a stabilizing agent; and wherein component (iii) comprises a water-dispersible grind resin, and, optionally, a stabilizing agent; and wherein the molar ratio of elemental bismuth to stabilizing agent in the electrodepositable coating composition is less than 1:0.25; wherein one or more of components (i), (ii), and (iii) comprises a bismuth salt; and wherein one or more of components (i), (ii), and (iii) comprises the stabilizing agent.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As employed herein, the term "number" means one or an integer greater than one.

As used herein, plural phrases or terms encompasses their singular counterparts and vice versa, unless specifically stated otherwise. By way of illustration, and not limitation, although reference is made herein to "a" stabilizing agent, "a" bismuth salt, "a" film-forming polymer; a plurality of these materials may be used in the present invention. As used herein, "plurality" means two or more.

As used herein, "includes" and like terms means "including without limitation."

As used herein, the use of "or" means "and/or" unless specifically stated otherwise, even though "and/or" may be explicitly used in certain instances.

As used herein, "molecular weight" means weight average molecular weight (Mw) as determined by Gel Permeation Chromatography.

As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will comprise the residues of such monomer components.

Electrodepositable Coating Composition

As stated above, the present invention is directed to an electrodepositable (electrodeposition or e-coat) coating composition. The electrodepositable coating composition comprises a bismuth salt and a stabilizing agent. Moreover, the molar ratio of elemental bismuth to the stabilizing agent in the electrodepositable coating composition is not less than 1:0.25. Unlike other electrodepositable coating compositions that typically have a shelf life of around 3 days; it has been found that, in certain embodiments, the electrodepositable coating composition of the present invention can have a shelf life ranging from 4 days to 28 days.

Suitable bismuth salts that may be used in the present invention include, without limitation, bismuth oxide, bismuth hydroxide, bismuth carbonate, bismuth sulfamate, bismuth methane sulfanate, or combinations thereof.

In certain embodiments, the bismuth salt is the reaction product of a bismuth compound and an acid compound. Suitable materials that may be used as the bismuth compound include, without limitation, bismuth oxide, bismuth hydroxide, bismuth carbonate, bismuth sulfamate, bismuth methane sulfanate, or combinations thereof. Suitable materials that may be used as the acid compound include, without limitation, sulfamic acid, methane sulfonic acid, or combinations thereof.

In certain embodiments, the molar ratio of the bismuth compound to the acid compound ranges from 10:1 to 1:2, such as from 2:1 to 1:1.

The electrodepositable coating composition also comprises a stabilizing agent. Suitable stabilizing agents that may be used in the present invention include, without limitation, 2-mercapto-5-methyl-1,3,4-thiadiazole, 2,5-dimercapto-1,3,4-thiadiazole, 2-mercaptobenzothiazole, or combinations thereof.

As stated above, the molar ratio of elemental bismuth to the stabilizing agent in the electrodepositable coating composition is not less than 1:0.25. It will be appreciated that the electrodepositable coating composition of the present invention contains, even in trace amounts, some amount of the stabilizing agent. That is, the amount of stabilizing agent used in the electrodepositable coating composition is >0. In certain embodiments, the molar ratio of elemental bismuth to the stabilizing agent ranges from 1:0.001 to 1:0.25, such as 1:0.01 to 1:0.10 or from 1:0.05 to 1:0.25.

In certain embodiments, the coating composition comprises a film-forming polymer and a curing agent that is capable of reacting with the film-forming polymer. A wide variety of film-forming polymers can be used so long as the film-forming polymers are "water dispersible." As used herein, "water dispersible" means that a material is adapted to be solubilized, dispersed, and/or emulsified in water. Examples of film-forming polymers suitable for use in the present invention, without limitation, resins or polymers derived from a polyepoxide, an acrylic, a polyurethane, a polyester, or combinations thereof. In certain embodiments, the film-forming polymer can comprise functional groups. As used herein, "functional groups" or "reactive functional groups" mean hydroxyl, carboxyl, carbamate, epoxy, isocyanate, aceto acetate, amine-salt, mercaptan, or combinations thereof. The film-forming polymer described above is also ionic in nature. Specifically, the film-forming polymers can be cationic. In other words, the film-forming polymer comprises cationic salt groups, generally prepared by neutralizing a functional group on the film-forming polymer with an acid, which enables the film-forming polymer to be electrodeposited onto a cathode. For example, in some embodiments, a film-forming cationic polymer can be derived by first reacting a polyepoxide containing polymer with an amine, such as those described above, 1,5,7-triazabicyclo[5.5.0]dec-5-ene (TBD), sulfides, or combinations thereof, then reacting the polymer with an acid. Depending on compound that is used to react with the epoxy functional polymer, the acid can either be added to the polymer after the polymer has been reacted with the amine, TBD, and/or sulfide or it can be added to the polymer in combination with these compounds.

The electrodepositable coating composition of the present invention can also comprise a curing agent (crosslinking agent) that is reactive towards that film-forming resin described in the preceding paragraphs. For example, the film-forming agent may comprise moieties that are reactive with the functional groups of the film-forming polymer. Suitable crosslinking agents that may be used include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof. In some embodiments, the curing agent can comprise from 30 weight % to 40 weight % based on the total resin solids of the electrodepositable coating composition.

In certain embodiments, the electrodepositable coating composition may further comprise a curing catalyst which may be used to catalyze the reaction between the crosslinking agent and the film-forming polymer. Suitable curing catalysts that may be used in the present invention include, without limitation, organotin compounds (e.g., dibutyltin oxide, dioctyltin oxide) and salts thereof (e.g., dibutyltin diacetate); other metal oxides (e.g., oxides of copper, manganese, cerium, zirconium and/or bismuth) and salts thereof (e.g., bismuth sulfamate and/or bismuth lactate), a cyclic guanidine (as described in paragraphs [0010] to [0015] of U.S. Pat. Pub. 2009/0042060, the cited portions being incorporated herein be reference), or combinations thereof.

Method of Preparing the Electrodepositable Composition

The present invention is also directed to a method of making the electrodepositable coating described herein. Specifically, the present invention provides for a method of making the electrodepositable coating composition from (i) a first component, (ii) a second component, and (iii) a third component.

The method comprises dispersing components (i), (ii), and (iii) the third components in an aqueous solution, such as deionized water, thereby forming the electrodepositable coating composition disclosed herein. A suitable aqueous solution into which the components may be dispersed is water, such as deionized water.

In general, the (i) first component, which can be described as the main vehicle (clear resin feed), comprises a film-forming polymer and curing agent, such as those described above; and, optionally, a stabilizing agent. The first component may also comprise any additional water-dispersible, non-pigmented components (e.g., catalysts, hindered amine light stabilizers).

In general, the (ii) second component, which can be described as the grind vehicle (pigment paste), comprises (e.g., titanium dioxide, carbon black), a water-dispersible grind resin, and, optionally, additives such as catalysts, antioxidants, biocides, defoamers, surfactants, wetting agents, dispersing aids, clays, hindered amine light stabilizers, UV light absorbers and stabilizers, the stabilizing agent, or combinations thereof. As is known in the art, the water-dispersible grind resin that is described in this paragraph can comprise a polymer. In certain embodiments, the polymer used in the second component can be the same polymer that is used as the film-forming polymer of the first component. For example, in some embodiments, the acrylic polymer used as the film-forming polymer of the first component can also be used as the water-dispersible grind resin of the second component. In other embodiments, the water-dispersible grind resin of the second component is a different polymer from that used in the first component. For example, an acrylic polymer may be used as the film-forming polymer of the first component while a polyester polymer may be used as the water-dispersible grind resin of the second component.

In certain embodiments, the (iii) third component comprises a water-dispersible grind resin and, optionally, the stabilizing agent. The water-dispersible grind resin of the third component can be the same or different from the water-dispersible grind resin that is used in the second component, which is described in detail in the preceding paragraph. In yet other embodiments, the polymer of the water-dispersible grind resin of the third component may be the same or different from the polymer of the film-forming polymer of the first component.

In embodiments where more than one of components (i), (ii), and (iii) comprise a stabilizing agent, the stabilizing agent in one component may be the same or different from the stabilizing agent in the other two components. For example, in certain embodiments, the first component may comprise 2-mercapto-5-methyl-1,3,4-thiadiazole as the stabilizing agent while the second component may comprise 2,5-dimercapto-1,3,4-thiadiazole. In other embodiments, the first and second components may both comprise 2-mercapto-5-methyl-1,3,4-thiadiazole as the stabilizing agent. The selection of a particular stabilizing agent and whether the stabilizing agent is present in the first, second, or third components will be dependent on the desired properties that a user seeks.

In some embodiments, the stabilizing agent is only present in the first component. That is, it is not present in either the second and/or third components. In other embodiments, the stabilizing agent is only present in the second component. In other words, the stabilizing agent is not present in either the first and/or third components. In yet other embodiments, the stabilizing agent is present only in the third component. If the stabilizing agent is present in one or both of the second and third components, the stabilizing agent typically undergoes or is subjected to mechanical grinding using techniques that are well known in the art.

One or more of components (i), (ii), and (iii) comprises the bismuth salt described above. In certain embodiments, the third component comprises the bismuth salt. In other embodiments, the first and/or second components comprise the bismuth salt. In yet other embodiments, only the second and third components comprise the bismuth salt.

After the electrodepositable coating composition is formed, the ratio of elemental bismuth to stabilizing agent in the coating composition is not less than 1:0.25.

Substrate with a Coating System

The electrodepositable coating composition described herein may be applied alone or as part of a coating system that can be deposited onto a number of different substrates. The coating system typically comprises a number of coating layers. A coating layer is formed when a coating composition that is deposited onto the substrate is substantially cured by methods known in the art such as those described below (e.g., by thermal heating or UV radiation).

Suitable substrates that can be coated with the electrodepositable coating composition of the present invention include, without limitation, metal substrates, metal alloy substrates, and/or substrates that have been metallized, such as nickel plated plastic. In some embodiments, the metal or metal alloy can be aluminum and/or steel. For example, the steel substrate could be cold rolled steel, electrogalvanized steel, and hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989. Alternatively, in other embodiments, the substrate is not pretreated with a pretreatment solution prior to coating the substrate with the coating composition described herein.

In certain embodiments, the electrodepositable coating composition of the present invention is applied over a bare (i.e., non-pretreated) substrate. In some embodiments, however, the electrodepositable coating composition of the present invention can be applied to a substrate that has been pretreated. After the electrodepositable coating composition is cured, a primer-surfacer coating composition may be applied onto at least a portion of the electrodepositable coating composition. The primer-surfacer coating composition is typically applied to the electrodepositable coating layer and cured prior to a subsequent coating composition being applied over the primer-surfacer coating composition.

The primer-surfacer layer that results from the primer-surfacer coating composition serves to enhance chip resistance of the coating system as well as aid in the appearance of subsequently applied layers (e.g., color imparting coating composition and/or substantially clear coating composition). As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482, which is incorporated in its entirety herein by reference.

It should be noted that in some embodiments, the primer-surfacer coating composition is not used in the coating system. Therefore, a color imparting basecoat coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989, 642, 6,245,855, 6,387,519, and 7,005,472, which are incorporated in their entirety herein by reference, can be used in the coating system. In certain embodiments, the substantially clear coating composition can also comprise a particle, such as a silica particle, that is dispersed in the clearcoat coating composition (such as at the surface of the clearcoat coating composition after curing).

One or more of the coating compositions described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in United States Patent Application Publication 2005-0287348, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

One or more of the coating compositions described above can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In addition to the materials described above, one or more of the coating compositions described above can also comprise an organic solvent. Suitable organic solvents that can be used in the coating composition include any of those listed in the preceding paragraphs as well as butyl acetate, xylene, methyl ethyl ketone, or combinations thereof.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures ≥10° C. In other embodiments, the curing operation can be carried out at temperature ≤246° C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, one or more of the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be ≤125 microns, such as ≤80 microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

A cationic resin was prepared from a mixture of the following ingredients:

| # | Material | Weight (grams) |
|---|---|---|
| 1 | DER 732[1] | 711.0 |
| 2 | Bisphenol A | 164.5 |
| 3 | Benzyldimethyl amine | 1.65 |
| 4 | Butyl Carbitol formal[3] | 78.8 |
| 5 | JEFFAMINE D400[2] | 184.7 |
| 6 | Bisphenol A diglicydal ether[4] | 19.1 |
| 7 | Butyl Carbitol formal | 3.4 |
|   | Resins from Reaction product of materials 1-7 | 988.6 |
| 8 | Deionized water | 1242.13 |
| 9 | Sulfamic acid | 30.2 |
| 10 | Deionized water | 614.8 |

[1]Aliphatic epoxy resin available from Dow Chemical Co.
[2]Polyoxypropylene diamine available from Huntsman Corp.
[3]Available as MAZON 1651 from BASF Corporation
[4]Available from Resolution Chemicals as EPON 828

Procedure: 711 g of DER 732[1] and 164.5 grams (g) bisphenol A were charged into a suitably equipped 3-liter round-bottomed flask. The mixture was heated to 130° C. and 1.65 g benzyldimethyl amine is added. The reaction mixture was held at 135° C. until the epoxide equivalent weight of the mixture is 1232. 78.8 g of butyl Carbitol formal[3] was then added and then the mixture was cooled to 95° C. 184.7 g Jeffamine D400[2] was added and the reaction was held at 95° C. until Gardner-Holdt viscosity of a sample of the resin diluted 50/50 in methoxy propanol is "HJ". A mixture of 19.1 g Epon 828[4] and 3.4 g butyl Carbitol formal was added and the mixture was held until the Gardner-Holdt viscosity of a sample of the resin diluted 50/50 in methoxy propanol is "Q–". 988.6 g of this resin was poured into a mixture of 1242.13 g deionized water and 30.2 g sulfamic acid and mixed for 30 minutes. 614.8 g of deionized water was then added and mixed well. The final aqueous dispersion had a measured solids content of 35.8%.

Example 2

A cationic paste was prepared from a mixture of the following ingredients:

| # | Material | Weight (grams) |
|---|---|---|
| 1 | Cationic Resin from Example 1 | 6454.18 |
| 2 | Bismuth (III) oxide | 2369.88 |
| 3 | Deionized water | 1593.63 |
| 4 | Sulfamic Acid | 665.98 |
| 5 | Surfynol GA | 40.37 |
| 6 | Deionized water | 300.00 |
| 7 | Deionized water | 976.0 |

Procedure: 6454.18 g of cationic resin from Example A and 2369.88 g of Technical Grade, bismuth (III) oxide (available from MCP, Germany), were charged to a stainless steel beaker, and dispersed with a high speed cowles blade for 15 minutes at a temperature of 35° C.-40° C. While maintaining stirring with the cowles blade, 1593.63 g of deionized water was added followed immediately by 665.98 g of Sulfamic acid and the resultant mixture was dispersed for an additional 90 minutes with a high speed cowles blade at a temperature of 35° C.-40° C. To the resultant dispersion, 40.37 g of Surfynol GA (Air Products and Chemicals, Inc) and 300 g of deionized water was added and allowed to mix for 15 minutes with the high speed cowles blade. The resultant mixture was then processed in a HML 1.5 L Premier Mill with ER120 Zircoa grind media (available from SEPR—SAINT-GOBAIN ZIR- PRO, France) for 2 passes at 40° C.-45° C. After the 2$^{nd}$ pass, 976 g of deionized water was added with stirring to achieve a final viscosity of 846 cps.

Example 3

A cationic paste that contains 1.82% bismuth was prepared from a mixture of the following ingredients:

| # | Material | Weight (grams) |
|---|----------|----------------|
| 1 | A-W9774-1P5 gray paste[1] | 265.0 |
| 2 | Cationic Paste from Example 2 | 35.0 |
| 3 | Deionized Water | 31.0 |

[1]Catalyst free cationic paste available from PPG Industries, Inc.

Procedure: Items 1, 2 and 3 were combined in a stainless steel beaker and stirred with constant agitation for a minimum of 20 minutes.

Example 4

A cationic paste that was 1.85% bismuth and 0.324% 2-Mercapto-5-methyl-1,3,4-thiadiazole (also known as MMTD) was prepared from a mixture of the following ingredients:

| # | Material | Weight (grams) |
|---|----------|----------------|
| 1 | A-W9774-1P5 gray paste[1] | 880.3 |
| 2 | Cationic paste from Example 2 | 116.3 |
| 3 | 2-Mercapto-5-methyl-1,3,4-thiadiazole | 3.49 |
| 4 | Deionized Water | 78.8 |

[1]Catalyst free cationic paste available from PPG Industries, Inc.

Procedure: Items 1, 2, 3 and 4 were combined in a stainless steel and stirred with constant agitation for a minimum of 20 minutes.

Example 5

A cationic paste that was 1.85% bismuth and 0.246% 2-Mercapto-5-methyl-1,3,4-thiadiazole was prepared from a mixture of the following ingredients:

| # | Material | Weight (grams) |
|---|----------|----------------|
| 1 | A-W9774-1P5 gray paste[1] | 881.04 |
| 2 | Cationic paste from Example 2 | 116.30 |
| 3 | 2-Mercapto-5-methyl-1,3,4-thiadiazole | 2.66 |
| 4 | Deionized Water | 81.50 |

[1]Catalyst free cationic paste available from PPG Industries, Inc.

Procedure: Items 1, 2, 3 and 4 were combined in a stainless steel and stirred with constant agitation for a minimum of 20 minutes.

Example 6

A cationic paste that was 1.76% bismuth and 0.162% 2-Mercapto-5-methyl-1,3,4-thiadiazole was prepared from a mixture of the following ingredients:

| # | Material | Weight (grams) |
|---|----------|----------------|
| 1 | A-W9774-1P5 gray paste[1] | 887.7 |
| 2 | Cationic paste from Example 2 | 110.6 |
| 3 | 2-Mercapto-5-methyl-1,3,4-thiadiazole | 1.74 |
| 4 | Deionized Water | 76.3 |

[1]Catalyst free cationic paste available from PPG Industries, Inc.

Procedure: Items 1, 2, 3 and 4 were combined in a stainless steel and stirred with constant agitation for a minimum of 20 minutes.

Example 7

A cationic paste that was 1.86% bismuth and 0.334% 2,5-Dimercapto-1,3,4-thiadiazole (also know as DMTD) was prepared from a mixture of the following ingredients:

| # | Material | Weight (grams) |
|---|----------|----------------|
| 1 | A-W9774-1P5 gray paste[1] | 888.4 |
| 2 | Cationic paste from Example 2 | 108.0 |
| 3 | 2,5-Dimercapto-1,3,4-thiadiazole | 3.60 |
| 4 | Deionized Water | 76.27 |

[1]Catalyst free cationic paste available from PPG Industries, Inc.

Procedure: Items 1, 2, 3 and 4 were combined in a stainless steel and stirred with constant agitation for a minimum of 20 minutes.

Example 8

A cationic paste that was 1.76% bismuth and 0.158% 2,5-Dimercapto-1,3,4-thiadiazole was prepared from a mixture of the following ingredients:

| # | Material | Weight (grams) |
|---|----------|----------------|
| 1 | A-W9774-1P5 gray paste[1] | 890.0 |
| 2 | Cationic paste from Example 2 | 108.2 |
| 3 | 2,5-Dimercapto-1,3,4-thiadiazole | 1.8 |
| 4 | Deionized Water | 139.50 |

[1]Catalyst free cationic paste available from PPG Industries, Inc.

Procedure: Items 1, 2, 3 and 4 were combined in a stainless steel and stirred with constant agitation for a minimum of 20 minutes.

Example 9

A cationic paste that was 1.87% bismuth and 0.413% 2-Mercaptobenzothiazole (also known as MBT) was prepared from a mixture of the following ingredients:

| # | Material | Weight (grams) |
|---|----------|----------------|
| 1 | A-W9774-1P5 gray paste[1] | 879.4 |
| 2 | Cationic paste from Example 2 | 116.2 |
| 3 | 2-Mercaptobenzothiazole | 4.41 |
| 4 | Deionized Water | 66.7 |

[1]Catalyst free cationic paste available from PPG Industries, Inc.

Procedure: Items 1, 2, 3 and 4 were combined in a stainless steel and stirred with constant agitation for a minimum of 20 minutes.

Example 10

A cationic paste that was 1.79% bismuth and 0.206% 2-Mercaptobenzothiazole was prepared from a mixture of the following ingredients:

| # | Material | Weight (grams) |
|---|---|---|
| 1 | A-W9774-1P5 gray paste[1] | 882.8 |
| 2 | Cationic paste from Example 2 | 112.0 |
| 3 | 2-Mercaptobenzothiazole | 2.21 |
| 4 | Deionized Water | 76.1 |

[1]Catalyst free cationic paste available from PPG Industries, Inc.

Procedure: Items 1, 2, 3 and 4 were combined in a stainless steel and stirred with constant agitation for a minimum of 20 minutes.

Example 11

This example describes the preparation of a cationic electrodeposition coating that is 1.2% bismuth on resin solids and 0 moles of MMTD. The electrodeposition coating was prepared using the following mixture:

| # | Material | Weight (grams) | Resin Solids (grams) | Bismuth (grams) | Bismuth (moles) | MMTD (grams) | MMTD (moles) |
|---|---|---|---|---|---|---|---|
| 1 | A-W7814-1BO Cationic Resin[1] | 930.0 | 338.1 | 0.0 | 0.0 | 0.0 | 0.0 |
| 2 | Cationic Paste from Example 3 | 250.0 | 42.0 | 4.5 | 0.0215 | 0 | 0 |
| 3 | Deionized water | 1020.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture was then ultrafiltered 20% (remove 440.0 grams of permeate and replace with 440.0 grams of deionized water).

Example 12

This example describes the preparation of a cationic electrodeposition coating that is 1.2% bismuth on resin solids and 0.28 mole equivalent of MMTD to each mole of bismuth. The electrodeposition coating was prepared using the following mixture:

| # | Material | Weight (grams) | Resin Solids (grams) | Bismuth (grams) | Bismuth (moles) | MMTD (grams) | MMTD (moles) |
|---|---|---|---|---|---|---|---|
| 1 | A-W7814-1BO Cationic Resin[1] | 925.0 | 336.2 | 0.0 | 0.0 | 0.0 | 0.0 |
| 2 | Cationic Paste from Example 4 | 245.0 | 42.7 | 4.5 | 0.0215 | 0.793 | 0.0060 |
| 3 | Deionized water | 1045.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture is then ultrafiltered 20% (remove 440.0 grams of permeate and replace with 440.0 grams of deionized water).

Example 13

This example describes the preparation of a cationic electrodeposition coating that was 1.2% bismuth on resin solids and 0.21 mole equivalent of MMTD to each mole of bismuth. The electrodeposition coating was prepared using the following mixture:

| # | Material | Weight (grams) | Resin Solids (grams) | Bismuth (grams) | Bismuth (moles) | MMTD (grams) | MMTD (moles) |
|---|---|---|---|---|---|---|---|
| 1 | A-W7814-1BO Cationic Resin[1] | 928.0 | 337.3 | 0.0 | 0.0 | 0.0 | 0.0 |
| 2 | Cationic Paste from Example 5 | 246.0 | 42.7 | 4.5 | 0.0215 | 0.605 | 0.0046 |
| 3 | Deionized water | 1026.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture was then ultrafiltered 20% (remove 440.0 grams of permeate and replace with 440.0 grams of deionized water).

Example 14

This example describes the preparation of a cationic electrodeposition coating that was 1.2% bismuth on resin solids and 0.14 mole equivalent of MMTD to each mole of bismuth. The electrodeposition coating was prepared using the following mixture:

| # | Material | Weight (grams) | Resin Solids (grams) | Bismuth (grams) | Bismuth (moles) | MMTD (grams) | MMTD (moles) |
|---|---|---|---|---|---|---|---|
| 1 | A-W7814-1BO Cationic Resin[1] | 916.0 | 332.6 | 0.0 | 0.0 | 0.0 | 0.0 |
| 2 | Cationic Paste from Example 6 | 256.0 | 44.3 | 4.5 | 0.0215 | 0.414 | 0.0031 |
| 3 | Deionized water | 1029.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture is then ultrafiltered 20% (remove 440.0 grams of permeate and replace with 440.0 grams of deionized water).

Example 15

This example describes the preparation of a cationic electrodeposition coating that was 1.2% bismuth on resin solids and 0.25 mole equivalent of DMTD to each mole of bismuth. The electrodeposition coating was prepared using the following mixture:

| # | Material | Weight (grams) | Resin Solids (grams) | Bismuth (grams) | Bismuth (moles) | DMTD (grams) | DMTD (moles) |
|---|---|---|---|---|---|---|---|
| 1 | A-W7814-1BO Cationic Resin[1] | 925.0 | 336.2 | 0.0 | 0.0 | 0.0 | 0.0 |
| 2 | Cationic Paste from Example 7 | 245.0 | 42.7 | 4.6 | 0.0220 | 0.819 | 0.0055 |
| 3 | Deionized water | 1030.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture was then ultrafiltered 20% (remove 440.0 grams of permeate and replace with 440.0 grams of deionized water).

Example 16

This example describes the preparation of a cationic electrodeposition coating that was 1.2% bismuth on resin solids and 0.126 mole equivalent of DMTD to each mole of bismuth. The electrodeposition coating was prepared using the following mixture:

| # | Material | Weight (grams) | Resin Solids (grams) | Bismuth (grams) | Bismuth (moles) | DMTD (grams) | DMTD (moles) |
|---|---|---|---|---|---|---|---|
| 1 | A-W7814-1BO Cationic Resin[1] | 925.0 | 336.2 | 0.0 | 0.0 | 0.0 | 0.0 |
| 2 | Cationic Paste from Example 8 | 258.0 | 42.6 | 4.5 | 0.0215 | 0.408 | 0.0027 |
| 3 | Deionized water | 1017.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture was then ultrafiltered 20% (remove 440.0 grams of permeate and replace with 440.0 grams of deionized water).

Example 17

This example describes the preparation of a cationic electrodeposition coating that was 1.2% bismuth on resin solids and 0.27 mole equivalent of MBT to each mole of bismuth. The electrodeposition coating was prepared using the following mixture:

| # | Material | Weight (grams) | Resin Solids (grams) | Bismuth (grams) | Bismuth (moles) | MBT (grams) | MBT (moles) |
|---|---|---|---|---|---|---|---|
| 1 | A-W7814-1BO Cationic Resin[1] | 928.0 | 337.3 | 0.0 | 0.0 | 0.0 | 0.0 |
| 2 | Cationic Paste from Example 9 | 244.0 | 43.2 | 4.6 | 0.0220 | 1.01 | 0.0060 |
| 3 | Deionized water | 1028.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture was then ultrafiltered 20% (remove 440.0 grams of permeate and replace with 440.0 grams of deionized water).

Example 18

This example describes the preparation of a cationic electrodeposition coating that was 1.2% bismuth on resin solids and 0.14 mole equivalent of MBT to each mole of bismuth. The electrodeposition coating was prepared using the following mixture:

| # | Material | Weight (grams) | Resin Solids (grams) | Bismuth (grams) | Bismuth (moles) | MBT (grams) | MBT (moles) |
|---|---|---|---|---|---|---|---|
| 1 | A-W7814-1BO Cationic Resin[1] | 918.0 | 333.7 | 0.0 | 0.0 | 0.0 | 0.0 |
| 2 | Cationic Paste from Example 10 | 252.0 | 43.7 | 4.5 | 0.0215 | 0.519 | 0.0031 |
| 3 | Deionized water | 1030.0 | 0.0 | 0.0 | 0.0 | 0.0 | 0.0 |

[1]Cationic epoxy resin available from PPG Industries, Inc.

Procedure: Material 1 was charged in a one gallon container. Half of material 3 was added to the one gallon container. Material 2 was diluted with the remainder of material 3 and added to the one gallon container under agitation. The mixture was allowed to stir for a minimum of one hour. The mixture was then ultrafiltered 20% (remove 440.0 grams of permeate and replace with 440.0 grams of deionized water).

TABLE 1

160° C./30 min Cure Response Evaluation on Phosphated[1] Cold Rolled Steel Panels

| Paint Formulation | % Bismuth on Resin Solids in Coating | Initial Cure Response[2] 24 hours @ Ambient Temp | Cure Response[2] after 4 days @ 120° F. | Cure Response[2] after 7 days @ 120° F. | Cure Response[2] after 14 days @ 120° F. | Cure Response[2] after 21 days @ 120° F. | Cure Response[2] after 28 days @ 120° F. |
|---|---|---|---|---|---|---|---|
| Control-Std Bismuth Paint with no mercapto ligand | 1.20 | 10 | 6 | 4 | N/A | N/A | N/A |
| Bismuth Paint with 0.28 mole equiv of MMTD | 1.20 | 10 | 10 | 10 | 10 | 9 | 10 |
| Bismuth Paint with 0.21 mole equiv of MMTD | 1.20 | 10 | 10 | 10 | 10 | 10 | 10 |
| Bismuth Paint with 0.14 mole equiv of MMTD | 1.20 | 10 | 10 | 10 | 10 | 10 | 10 |
| Bismuth Paint with 0.25 mole equiv of DMTD | 1.20 | 10 | 9 | 8 | 7 | 6 | N/A |
| Bismuth Paint with 0.13 mole equiv of DMTD | 1.20 | 10 | 8 | 7 | 5 | N/A | N/A |
| Bismuth Paint with 0.27 mole equiv of MBT | 1.20 | 10 | 10 | 10 | 8 | 9 | 8 |
| Bismuth Paint with 0.14 mole equiv of MBT | 1.20 | 10 | 10 | 10 | 8 | 9 | 9 |

[1]Cold Rolled Steel test panels pretreated with CHEMFOS 700 phosphate/deionized water rinse available from ACT Test Panel Technologies (Hillsdale, MI)
[2]Cure Response Evaluation (Note: Evaluation discontinued after 2 consecutive marginal/failing ratings)
100 Double Acetone Rubs, rating 1-10 scale
FAIL
1-Rub through to Metal in <25 rubs
2-Rub through to Metal in <50 rubs
3-Rub through to Metal in <100 rubs
4-Severely marred over entire rub area. Very easy to Scratch to metal
5-Marred over rub area. Can scratch through to metal
6-Uniform Mar in center of rub area. Can scratch to metal, with difficulty.
MARGINAL
7-Non uniform marring over rub area. Can NOT scratch to metal
PASSING
8-Slight marring of rub area; can NOT scratch to metal
9-Visible evidence of Rub. Light scratching of rub area; NO scratch to metal
10-No Visible Damage

TABLE 2

160° C./30 min Cure Response Evaluation on Phosphated[1] Electrogalvanized Steel Panels

| Paint Formulation | % Bismuth on Resin Solids in Coating | Initial Cure Response[2] 24 hours @ Ambient Temp | Cure Response[2] after 4 days @ 120° F. | Cure Response[2] after 7 days @ 120° F. | Cure Response[2] after 14 days @ 120° F. | Cure Response[2] after 21 days @ 120° F. | Cure Response[2] after 28 days @ 120° F. |
|---|---|---|---|---|---|---|---|
| Control-Std Bismuth Paint with no mercapto ligand | 1.20 | 9 | 5 | 3 | N/A | N/A | N/A |
| Bismuth Paint with 0.28 mole equiv of MMTD | 1.20 | 10 | 10 | 10 | 10 | 10 | 10 |
| Bismuth Paint with 0.21 mole equiv of MMTD | 1.20 | 10 | 10 | 10 | 10 | 10 | 9 |
| Bismuth Paint with 0.14 mole equiv of MMTD | 1.20 | 10 | 10 | 10 | 10 | 10 | 10 |

TABLE 2-continued

160° C./30 min Cure Response Evaluation on Phosphated[1] Electrogalvanized Steel Panels

| Paint Formulation | % Bismuth on Resin Solids in Coating | Initial Cure Response[2] 24 hours @ Ambient Temp | Cure Response[2] after 4 days @ 120° F. | Cure Response[2] after 7 days @ 120° F. | Cure Response[2] after 14 days @ 120° F. | Cure Response[2] after 21 days @ 120° F. | Cure Response[2] after 28 days @ 120° F. |
|---|---|---|---|---|---|---|---|
| Bismuth Paint with 0.25 mole equiv of DMTD | 1.20 | 10 | 8 | 6 | 6 | N/A | N/A |
| Bismuth Paint with 0.13 mole equiv of DMTD | 1.20 | 8 | 7 | 6 | N/A | N/A | N/A |
| Bismuth Paint with 0.27 mole equiv of MBT | 1.20 | 9 | 10 | 10 | 9 | 8 | 8 |
| Bismuth Paint with 0.14 mole equiv of MBT | 1.20 | 9 | 9 | 10 | 8 | 8 | 9 |

[1]Cold Rolled Steel test panels pretreated with CHEMFOS 700 phosphate/deionized water rinse available from ACT Test Panel Technologies (Hillsdale, MI)
[2]Cure Response Evaluation (Note: Evaluation discontinued after 2 consecutive marginal/failing ratings)
100 Double Acetone Rubs, rating 1-10 scale
FAIL
1-Rub through to Metal in <25 rubs
2-Rub through to Metal in <50 rubs
3-Rub through to Metal in <100 rubs
4-Severely marred over entire rub area. Very easy to Scratch to metal
5-Marred over rub area. Can scratch through to metal
6-Uniform Mar in center of rub area. Can scratch to metal, with difficulty.
MARGINAL
7-Non uniform marring over rub area. Can NOT scratch to metal
PASSING
8-Slight marring of rub area; can NOT scratch to metal
9-Visible evidence of Rub. Light scratching of rub area; NO scratch to metal
10-No Visible Damage The data reported in Tables 1 and 2 illustrate the thermal stability imparted to the cationic electrodeposition coatings upon the addition of mercapto ligands to the respective cationic pastes from Examples 4, 5, 6, 7, 8, 9, 10 in the electrodeposition baths of the invention.

What is claimed is:

1. An electrodepositable coating composition comprising an ionic film-forming polymer, a bismuth salt, and a stabilizing agent comprising 2-mercapto-5-methyl-1,3,4-thiadiazole, 2,5-dimercapto-1,3,4-thiadiazole, 2-mercaptobenzothiazole, or combinations thereof; and wherein the molar ratio of elemental bismuth to the stabilizing agent is 1:0.27, 1:0.28 or from 1:0.001 to 1:0.25.

2. The electrodepositable coating composition according to claim 1, wherein the bismuth salt is the reaction product of a bismuth compound and an acid compound.

3. The electrodepositable coating composition according to claim 2, wherein the acid compound comprises sulfamic acid, methane sulfonic acid, or combinations thereof.

4. The electrodepositable coating composition according to claim 2, wherein the bismuth compound comprise bismuth oxide, bismuth hydroxide, or combinations thereof.

5. The electrodepositable coating composition according to claim 1, wherein the molar ratio of elemental bismuth to the stabilizing agent ranges from 1:0.01 to 1:0.10.

6. A substrate at least partially coated with the coating composition of claim 1.

7. The substrate according to claim 6, wherein the substrate pretreated prior to being coated with the coating composition of claim 1.

8. The electrodepositable coating composition of claim 1, wherein the ionic film-forming polymer comprises cationic salt groups.

9. The electrodepositable coating composition of claim 1, wherein the ionic film-forming polymer comprises reactive functional groups and the electrodepositable coating composition further comprises a curing agent that is reactive towards the ionic film-forming polymer.

10. A method for making an electrodepositable coating composition comprising: (i) a first component, (ii) a second component, and (iii) a third component; the method comprising:
dispersing components (i), (ii), and (iii), into an aqueous solution; wherein component (i) comprises an ionic film-forming polymer, a curing agent that is capable of reacting with the film-forming polymer, and, optionally, a stabilizing agent; wherein component (ii) comprises a water-dispersible grind resin, a pigment, and, optionally, a stabilizing agent; and wherein component (iii) comprises a water-dispersible grind resin, and, optionally, a stabilizing agent; wherein one or more of components (i), (ii), and (iii) comprises a bismuth salt; wherein one or more of components (i), (ii), and (iii) comprises the stabilizing agent, said stabilizing agent comprising 2-mercapto-5-methyl-1,3,4-thiadiazole, 2,5-dimercapto-1,3,4-thiadiazole, 2-mercaptobenzothiazole, or combinations thereof; and wherein the molar ratio of elemental bismuth to the stabilizing agent in the electrodepositable coating is 1:0.27, 1:0.28 or from 1:0.001 to 1:0.25.

11. The method according to claim 10, wherein the (iii) third component comprises a bismuth salt.

12. The method according to claim 10, wherein the bismuth salt is the reaction product of a bismuth compound and an acid compound.

13. The method according to claim 12, wherein the bismuth compound comprises bismuth oxide, bismuth hydroxide, or combinations thereof.

14. The method according to claim 12, wherein the acid compound comprises sulfamic acid, methane sulfonic acid, or combinations thereof.

15. The method according to claim 10, wherein the first component is subjected to mechanical grinding prior to being dispersed in the aqueous solution.

16. The method according to claim 10, wherein the stabilizing agent is only present in the first component.

17. The method according to claim 10, wherein the stabilizing agent is only present in the second component.

18. The method according to claim 10, wherein the stabilizing agent is only present in the third component.

\* \* \* \* \*